UNITED STATES PATENT OFFICE.

DENNIS C. GATELY, OF NEWTOWN, CONNECTICUT.

IMPROVEMENT IN MANUFACTURING RUBBER BELTING.

Specification forming part of Letters Patent No. 26,982, dated January 31, 1860.

*To all whom it may concern:*

Be it known that I, DENNIS C. GATELY, of Newtown, in the county of Fairfield and State of Connecticut, have invented a new and useful process of making machine belting or banding made in part or wholly of india-rubber or gutta-percha; and I do hereby declare that the following description forms a full and exact specification of the same, wherein I have set forth the nature and principles of my said invention, by which it may be distinguished from all others of a similar class, together with such parts as I claim and desire to have secured to me by Letters Patent.

I have heretofore made an improvement in the manufacture of rubber or gutta-percha belting or banding, for which I have made application for Letters Patent, which consists in giving a smooth friction-surface to the belt or band by rolling it in thin sheets of flexible metal and then heating it. Another method of imparting a smooth and finished surface to the belt or band for the purpose of producing the best friction-surface, forms the subject of the present invention, and I will now proceed to describe its peculiar and distinctive features.

I make up a belt by any proper mode previous to vulcanization and place it between plates of smooth metal, either clamped or not, although it is best to clamp them together. The belt is then vulcanized while thus held between the plates, which are heated by being placed with the belt or band in a steam-boiler or by being subjected to dry heat or in any other suitable manner. By thus subjecting the belt or band to the pressure of the smooth surfaces of the metallic plates while being cured a belt or band is produced which possesses a smooth and finished surface.

The metallic plates may be made very long or in short sections, as may be desired, the belt or band being slipped along between the plates unclamped for the purpose, if necessary, as fast as vulcanized, and the uncured portions of it then subjected to heat between the plates, as before.

The surface of the metal plates can be prepared by planing, and the polished surface is the best. As I have already made separate application for Letters Patent for a belting or banding of india-rubber or gutta-percha having a smooth friction-surface, I shall confine myself in this application simply to the method of producing this smooth friction-surface.

In order to produce a similar surface upon the edges of the belt, I use grooved bars or narrow slabs of metal, which are laid between the plates and pressed against the edges of the belt in vulcanizing. The same effect can be produced by using grooved molds or plates fitting the surface of the belt.

Having thus described my new process, I shall state my claim as follows:

What I claim as my invention, and desire to secure by Letters Patent, is—

The method herein described of manufacturing belts or bands of india-rubber or gutta-percha, the same consisting in placing them in contact with smooth plates of metal and then heating them, substantially in the manner and for the purposes specified.

DENNIS C. GATELY.

Witnesses:
TIMOTHY CORNWELL,
S. D. BENNETT.